US010227069B2

(12) United States Patent
Lian et al.

(10) Patent No.: US 10,227,069 B2
(45) Date of Patent: Mar. 12, 2019

(54) METHOD AND SYSTEM FOR CONTROLLING VEHICLE WITH FOUR-WHEEL DRIVE AND VEHICLE (71) Applicant: BYD COMPANY LIMITED, Shenzhen, Guangdong (CN)

(72) Inventors: Yubo Lian, Shenzhen (CN); Heping Ling, Shenzhen (CN); Fanliang Meng, Shenzhen (CN); Mingchuan Shi, Shenzhen (CN); Weiqiang Chen, Shenzhen (CN)

(73) Assignee: BYD COMPANY LIMITED (CN)

( * ) Notice: Subject to any disclaimer, the term of this patent is extended or adjusted under 35 U.S.C. 154(b) by 0 days.

(21) Appl. No.: 15/743,547

(22) PCT Filed: Jul. 8, 2016

(86) PCT No.: PCT/CN2016/089418
§ 371 (c)(1),
(2) Date: Jan. 10, 2018

(87) PCT Pub. No.: WO2017/008700
PCT Pub. Date: Jan. 19, 2017

(65) Prior Publication Data
US 2018/0201255 A1 Jul. 19, 2018

(30) Foreign Application Priority Data

Jul. 10, 2015 (CN) .......................... 2015 1 0405819

(51) Int. Cl.
*B60W 30/045* (2012.01)
*B60K 7/00* (2006.01)
*B60L 15/20* (2006.01)
*B60K 1/00* (2006.01)
*B60K 17/04* (2006.01)
*B60K 17/14* (2006.01)
*B60K 17/34* (2006.01)

(52) U.S. Cl.
CPC ............. *B60W 30/045* (2013.01); *B60K 1/00* (2013.01); *B60K 7/0007* (2013.01);
(Continued)

(58) Field of Classification Search
CPC ........... B60W 30/045; B60W 2540/18; B60W 2710/083; B60W 2710/207;
(Continued)

(56) References Cited

U.S. PATENT DOCUMENTS 5,258,912 A 11/1993 Ghoneim et al.
5,265,020 A 11/1993 Nakayama
(Continued)

FOREIGN PATENT DOCUMENTS

CN 201442527 U 4/2010
CN 101716952 6/2010
(Continued)

OTHER PUBLICATIONS

International Search Report from PCT/CN2016/089418 dated Sep. 20, 2016 (3 pages).

*Primary Examiner* — Marthe Y Marc-Coleman
(74) *Attorney, Agent, or Firm* — Calfee, Halter & Griswold LLP (57) ABSTRACT

A method and a system for controlling a vehicle (100) with four-wheel drive are provided. The method includes: acquiring a vehicle condition information parameter by a vehicle condition information collector; obtaining a radius of turning circle to be reduced from a driver by a turning circle receiver (40); obtaining a controlling yaw moment corresponding to the radius of turning circle to be reduced according to the vehicle condition information parameter and the radius of turning circle to be reduced by a turning circle controller (11); and distributing the controlling yaw moment to four wheels (90) of the vehicle (100) according to an intensity level of the radius of turning circle to be reduced and the vehicle condition information parameter by the turning circle controller (11), such that the vehicle (100) turns circle.

20 Claims, 5 Drawing Sheets (52) U.S. Cl.
CPC ............ *B60K 17/043* (2013.01); *B60K 17/14* (2013.01); *B60K 17/34* (2013.01); *B60L 15/2036* (2013.01); *B60K 7/00* (2013.01); *B60K 2007/0092* (2013.01); *B60L 2240/24* (2013.01); *B60L 2240/423* (2013.01); *B60L 2250/00* (2013.01); *B60L 2260/28* (2013.01); *B60W 2540/18* (2013.01); *B60W 2710/083* (2013.01); *B60W 2710/207* (2013.01); *B60W 2720/14* (2013.01); *B60W 2720/403* (2013.01); *B60W 2720/406* (2013.01); *B60Y 2200/91* (2013.01); *B60Y 2400/304* (2013.01); *B60Y 2400/3032* (2013.01)

(58) Field of Classification Search
CPC ...... B60W 2720/403; B60W 2720/406; B60K 7/0007; B60L 15/2036; B60L 2240/24; B60L 2240/423; B60L 2250/00
USPC .......................................................... 701/22
See application file for complete search history.

(56) References Cited

U.S. PATENT DOCUMENTS

| | | |
|---|---|---|
| 6,691,008 B2 | 2/2004 | Kondo et al. |
| 8,924,114 B2* | 12/2014 | Matsuno ............. B60W 30/045 701/69 |
| 2007/0021875 A1 | 1/2007 | Naik et al. |
| 2010/0292904 A1* | 11/2010 | Taguchi .............. B60W 30/143 701/93 |
| 2014/0039772 A1 | 2/2014 | Jensen |
| 2014/0058643 A1 | 2/2014 | Kodama |

FOREIGN PATENT DOCUMENTS

| | | |
|---|---|---|
| CN | 101817366 | 9/2010 |
| CN | 102632924 A | 8/2012 |
| CN | 103057436 | 4/2013 |
| CN | 103434506 A | 12/2013 |
| CN | 103625465 A | 3/2014 |
| CN | 103879307 | 6/2014 |
| CN | 104085394 A | 10/2014 |
| CN | 104175902 A | 12/2014 |
| CN | 104210383 | 12/2014 |
| CN | 104210383 A | 12/2014 |
| CN | 104260727 A | 1/2015 |
| CN | 104590253 | 5/2015 |
| CN | 104760594 A | 7/2015 |
| DE | 102009020357 A1 | 12/2009 |
| EP | 2623386 | 7/2013 |
| JP | 2000001130 A | 1/2000 |
| JP | 6273953 B2 | 2/2018 |

* cited by examiner

METHOD AND SYSTEM FOR CONTROLLING VEHICLE WITH FOUR-WHEEL DRIVE AND VEHICLE

CROSS REFERENCE TO RELATED APPLICATION

This application is based on International Application No. PCT/CN2016/089418, filed on Jul. 8, 2016, which claims priority to and benefits of Chinese Patent Application No. 201510405819.0, filed with State Intellectual Property Office, P. R. C. on Jul. 10, 2015, the entire contents of which are incorporated herein by reference.

FIELD

Embodiments of the present disclosure generally relate to the vehicle, and more particularly, to a method for controlling a vehicle with four-wheel drive, a system for controlling a vehicle with four-wheel drive and a vehicle comprising the same.

BACKGROUND

With developments of modern road transport system and advanced vehicle technology, active safety performance technology of the vehicle is paid more attention increasingly.

Many factors may affect the active safety performance, such as dimensions of the vehicle design, drive power, the suspension structure of the vehicle, the steering performance of the vehicle, etc. Especially, the steering performance of the vehicle directly determines the active safety performance of the vehicle.

The vehicle with the conventional two-wheel steering system has slow steering response and nonflexible steering at low speed, and has poor directional stability at high speed. In addition, the two-wheel steering system in the related art is mostly driven by two rear wheels, and steered by two front wheels. Thus, the steering scope of the vehicle has been greatly restricted, and it is needed a certain region to steer. Sometimes, because the region is too small, the vehicle cannot turn circle once, only can turn back and then turn circle.

SUMMARY

Embodiments of the present disclosure seek to solve at least one of the problems existing in the related art to at least some extent.

Embodiments of a first aspect of the present disclosure provide a method for controlling a vehicle with four-wheel drive. The method for controlling a vehicle with four-wheel drive includes: acquiring a vehicle condition information parameter by a vehicle condition information collector; obtaining a radius of turning circle to be reduced from a driver by a turning circle receiver; obtaining a controlling yaw moment corresponding to the radius of turning circle to be reduced according to the vehicle condition information parameter and the radius of turning circle to be reduced by a turning circle controller; and distributing the controlling yaw moment to four wheels of the vehicle according to an intensity level of the radius of turning circle to be reduced and the vehicle condition information parameter by the turning circle controller, such that the vehicle turns circle.

Embodiments of a second aspect of the present disclosure provide a system for controlling a vehicle with four-wheel drive. The system includes: a vehicle condition information collector configured to acquire a vehicle condition information parameter; a turning circle receiver configured to obtain a radius of turning circle to be reduced from a driver; and a turning circle controller configured to obtain a controlling yaw moment corresponding to the radius of turning circle to be reduced according to the vehicle condition information parameter and the radius of turning circle to be reduced, and to distribute the controlling yaw moment to four wheels of the vehicle according to an intensity level of the radius of turning circle to be reduced and the vehicle condition information parameter, such that the vehicle turns circle.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings.

Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, unless specified or limited otherwise, it should be noted that, terms "mounted," "connected" and "coupled" may be understood broadly, such as electronic connections or mechanical connections, inner communications between two elements, direct connections or indirect connections through intervening structures, which can be understood by those skilled in the art according to specific situations.

With reference to the following descriptions and drawings, these and other aspects of embodiments of the present disclosure will become apparent. In the descriptions and drawings, some particular embodiments are described in order to show the principles of embodiments according to the present disclosure, however, it should be appreciated that the scope of embodiments according to the present disclosure is not limited herein. On the contrary, changes, alternatives, and modifications can be made in the embodiments without departing from spirit, principles and scope of the attached claims.

In the following, a method for controlling a vehicle with four-wheel drive and a system for controlling a vehicle with four-wheel drive and a vehicle are described in detail with reference to drawings.

Figure 1:
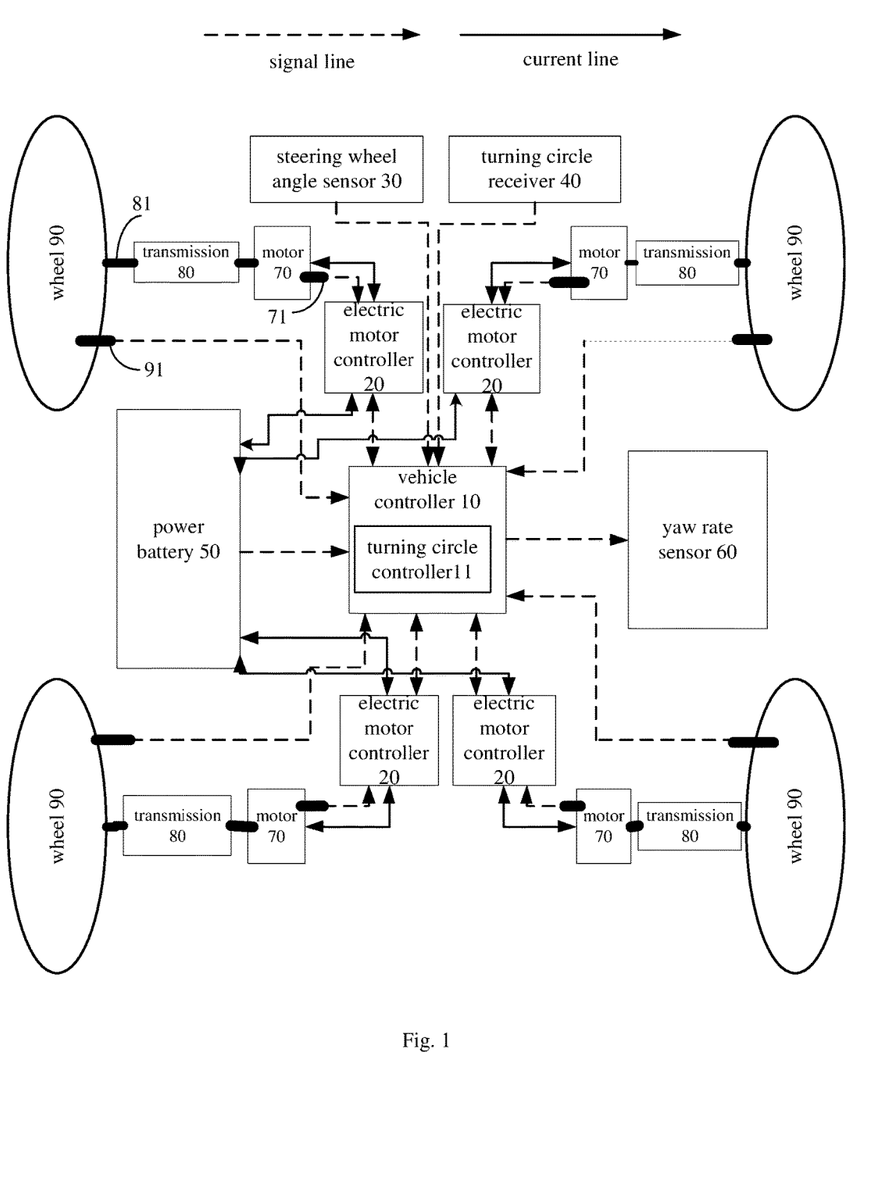
FIG. 1 is a schematic diagram of a vehicle applying a method and a system for controlling a vehicle with four-wheel drive according to an embodiment of the present disclosure.

FIG. 1 is a schematic diagram of a vehicle applying a method and a system for controlling a vehicle with four-wheel drive according to an embodiment of the present disclosure. As shown in FIG. 1, the vehicle 100 includes four electric motor controllers 20, four electric motors 70, and four wheels 90. Each electric motor controller 20 is configured to independently control the corresponding electric motor 70 to operate. Each electric motor 70 is configured to independently drive or feedback brake the corresponding wheel 90, for example, the positive torque (the direction thereof is the same with the rolling direction of the corresponding wheel 90) is applied to the corresponding wheel 90 or the reverse torque (the direction thereof is in the opposite to the rolling direction of the corresponding wheel 90) is applied to the corresponding wheel 90. In an embodiment, the electric motor 70 is a wheel side motor, and the vehicle 100 further includes four transmissions 80 and four transmission shafts 81, each electric motor 70 is connected with the corresponding wheel 90 via the corresponding transmission 80 and the corresponding transmission shaft 81, such that the vehicle 100 can achieve four-wheel drive.

The electric motor 70 is not limited in the above embodiment. In another embodiment, the electric motor 70 is an in-wheel motor, so that the electric motor 70 can directly couple with the corresponding wheel 90, thus eliminating the transmission 80 and the transmission shaft 81.

Four wheels 90 are arranged in the front shaft and the rear shaft. In addition, define the turning circle side of the vehicle is an inner side and the other side is an outer side, for example, when the vehicle 100 is turning circle to the left side, the left side is the inner side and the other side is the outer side, on the contrary, when the vehicle 100 is turning circle to the right side, and the right side is the inner side and the other side is the outer side. Accordingly, the four wheels 90 include a front inner wheel, a front outer wheel, a rear inner wheel and a rear outer wheel.

In an embodiment, the system for controlling a vehicle with four-wheel drive include a vehicle controller 10, a vehicle condition information collector (not shown), a turning circle receiver 40, the electric motor controller 20 and the electric motor 70. The vehicle controller 10, the vehicle condition information collector, the turning circle receiver 40, and the electric motor controller 20 are communicated with each other via a controller area network (CAN) bus of the vehicle.

The vehicle condition information collector is configured to acquire a vehicle condition information parameter of the vehicle. The vehicle condition information parameter includes at least one of a steering wheel angle signal, a yaw angle speed signal, a lateral acceleration signal, a longitudinal acceleration signal, a wheel speed signal and a motor speed signal.

In an embodiment, the vehicle condition information collector includes at least one of a steering wheel angle sensor 30, a yaw rate sensor 60, a rotary sensor 71 disposed on each electric motor 70, a wheel speed sensor 91 disposed on each wheel 90. The steering wheel angle sensor 30 is configured for detecting the steering wheel angle signal. The yaw rate sensor 60 includes a longitudinal acceleration sensor, a lateral acceleration sensor and a yaw angle speed sensor. The yaw angle speed sensor is configured for detecting the yaw angle speed signal. The longitudinal acceleration sensor is configured for detecting the longitudinal acceleration signal. The lateral acceleration sensor is configured for detecting the lateral acceleration signal. The rotary sensor 71 is configured for detecting the rotation speed of the corresponding electric motor 70 i.e. the motor speed. The wheel speed sensor 91 is configured for detecting the corresponding wheel speed i.e. the wheel speed. In an embodiment, the motor speed corresponding to the front inner wheel, the front outer wheel, the rear inner wheel and the rear outer wheel refers to nm1~nm4 respectively, and the wheel speed corresponding to the front inner wheel, the front outer wheel, the rear inner wheel and the rear outer wheel refers to n1~n4 respectively.

In addition, the electric motor controller 20 also can feed back the output of the electric motor 70 i.e. the motor torque via the CAN network. In an embodiment, the motor torque corresponding to the front inner wheel, the front outer wheel, the rear inner wheel and the rear outer wheel refers to Tm1~Tm4 respectively. Furthermore, the transmission rate corresponding to the front inner wheel, the front outer wheel, the rear inner wheel and the rear outer wheel refers to i1~i4 respectively, and the transmission efficiency refers to η1~η4 respectively. It can be understood that, the corresponding transmission rate i1~i4 and the corresponding transmission efficiency η1~η4 can be measured in different motor torque Tm1~Tm4 and stored in a search table. Thus, the wheel terminal torque can be obtained according to the measured motor torque T1~T4 and the transmission efficiencies η1~η4 and transmission rates i1~i4 from the search table.

The state of charge of the power battery 50 may be fed back via the CAN network by the power battery 50.

The turning circle receiver 40 is configured to obtain a radius of turning circle to be reduced from a driver.

The vehicle controller 10 is configured for controlling the operation of the vehicle 100, and may include a turning circle controller 11. The turning circle controller 11 is configured to obtain a controlling yaw moment corresponding to the radius of turning circle to be reduced according to the vehicle condition information parameter of the vehicle and the radius of turning circle to be reduced, and to distribute the controlling yaw moment to four wheels 90 of the vehicle according to an intensity level of the radius of turning circle to be reduced and the vehicle condition information parameter of the vehicle, such that the vehicle turns circle. It can be understood that, the vehicle controller 10 can include another controller configured to achieve other functions of the vehicle 100 besides the turning circle controller 11.

Figure 2:
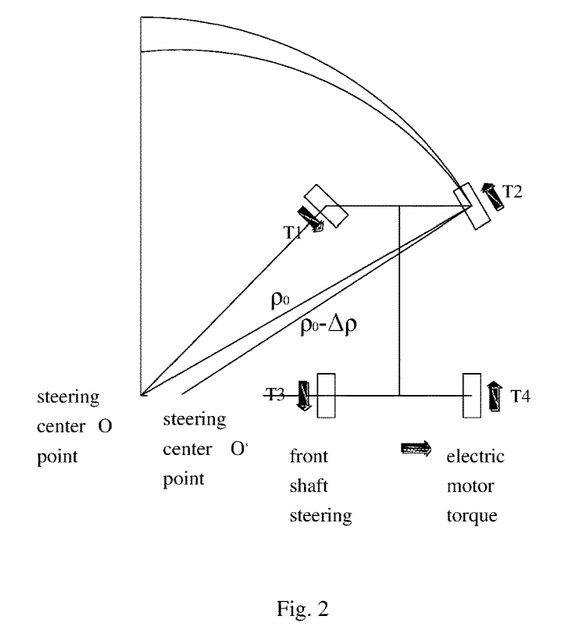
FIG. 2 is a schematic diagram of a radius of turning circle to be reduced for front wheels steering according to an embodiment of the present disclosure.
Figure 3:
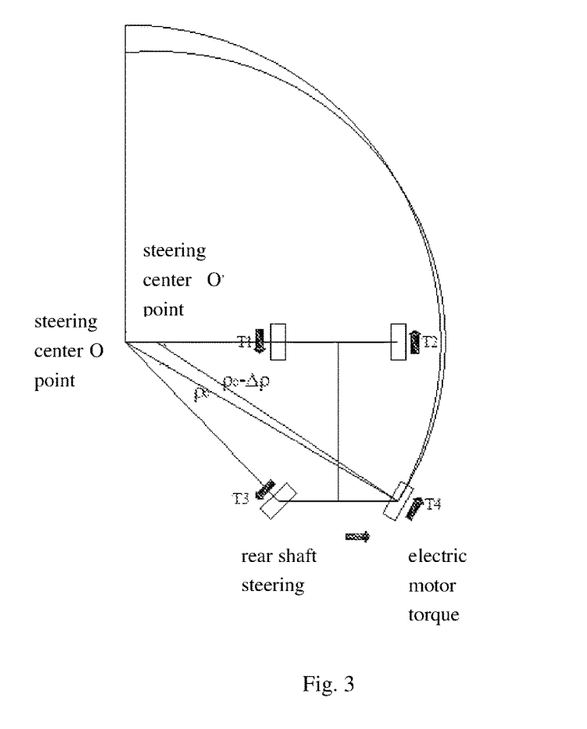
FIG. 3 is a schematic diagram of a radius of turning circle to be reduced for rear wheels steering according to an embodiment of the present disclosure.
Figure 4:
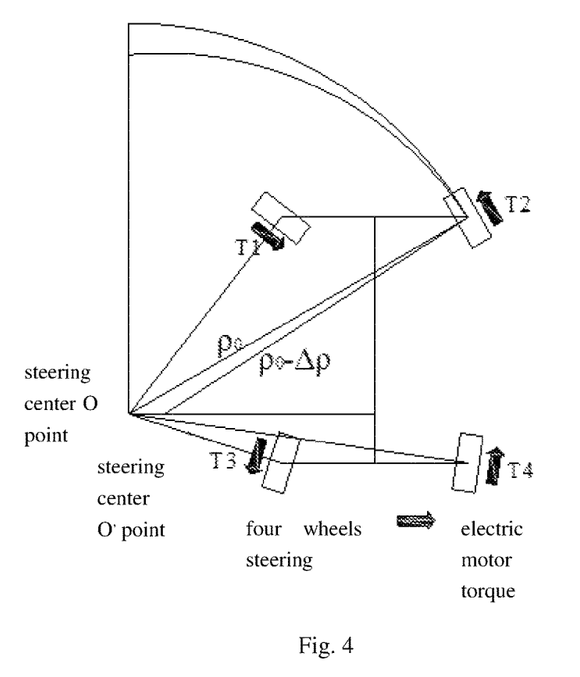
FIG. 4 is a schematic diagram of a radius of turning circle to be reduced for four wheels steering according to an embodiment of the present disclosure.

As shown in FIGS. 2-4, when the vehicle 10 is turning circle, the radius of turning circle $\rho$ is equal to $v/\dot\psi$, and the vehicle condition information collector is configured to acquire the current yaw angle speed $\dot\psi 0$, a sideslip angle $\beta 0$, the steering wheel angle $\delta$, the wheel speeds n1~n4 of the four wheels and the motor speeds nm1~nm4 of the electric motor.

It can be understood that, the vehicle speed can be calculated based on the wheel speeds n1~n4 or the motor speeds nm1~nm4, or an electronic stability program (ESP) in the vehicle controller 10 can send the calculated speed V to the turning circle controller 11. Thus, the current radius of turning circle $\rho 0$ can be obtained according to the yaw angle speed $\dot\psi 0$, by a formula of $\rho 0 = v/\dot\psi 0$.

Figure 5:
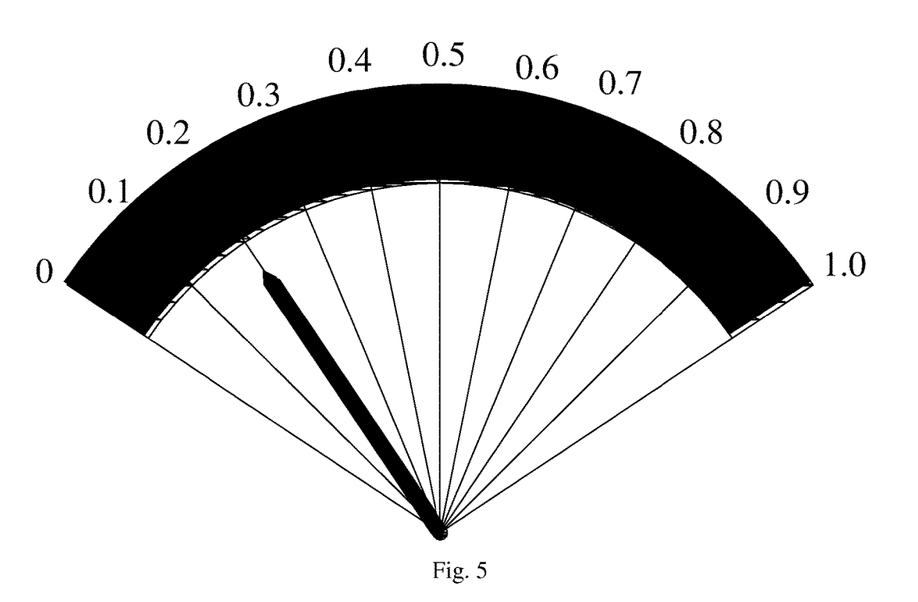
FIG. 5 is a schematic diagram of a turning circle receiver according to an embodiment of the present disclosure.

On the other hand, the drivers can input the radius $\Delta\rho$ of turning circle to be reduced by the turning circle receiver 40. In an embodiment, the turning circle receiver 40 can be disposed near the steering wheel of the vehicle 10. As shown in FIG. 5, the turning circle receiver 40 may include a dashboard 41. The dashboard 41 displays ten scales, and each scale refers to 0.1 m, that is, the setting scope is 0~1.0 m, in other words, if it is demanded the radius of turning circle to reduce by 0~1.0 m, that is, the radius of turning circle to be reduced is 0~1.0 m, the radius $\Delta\rho$ of turning circle to be reduced can be set according to a knob or the other input function. The radius $\Delta\rho$ of turning circle to be reduced can be divided into three intensity levels according to the driver demand and the vehicle capacity. When the radius $\Delta\rho$ of turning circle to be reduced is from equal to or larger than 0 to equal to or less than 0.3 m, the intensity level of the radius of turning circle to be reduced is a first intensity level; when the radius $\Delta\rho$ of turning circle to be reduced is from larger than 0.3 m to equal to or less than 0.6 m, the intensity level of the radius of turning circle to be reduced is a second intensity level; when the radius $\Delta\rho$ of turning circle is from larger than 0.6 m to equal to or less than 1.0 m, the intensity level of the radius of turning circle to be reduced is a third intensity level.

Figure 6:
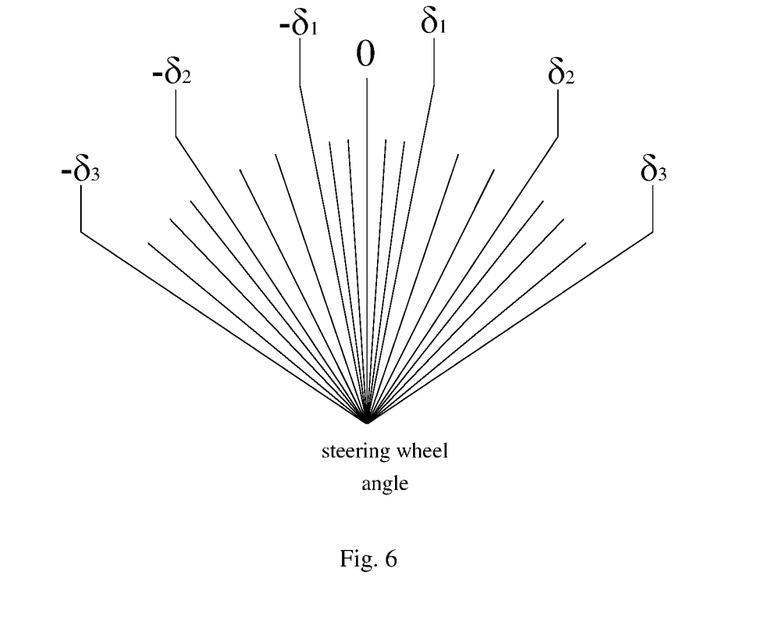
FIG. 6 is a schematic diagram of a turning circle receiver according to another embodiment of the present disclosure.

As shown in FIG. 6, in another embodiment, the turning circle receiver 40 is combined with the steering wheel. When the vehicle is turning circle, the driver turns around the steering wheel, the steering wheel angel sensor 30 can send the corresponding steering wheel angel to the vehicle controller 10, and the vehicle controller 10 can obtain the radius $\Delta\rho$ of turning circle to be reduced according to the steering wheel angel. For example, the steering wheel angel can be divided into three ranges, a first range is from equal to or larger than $-\delta 1$ to equal to 0 and from larger than 0 to equal to $\delta 1$, a second range is from larger than $-\delta 2$ to equal to $-\delta 1$ and from equal to or larger than $\delta 1$ to equal to $\delta 2$, a third range is from equal to or larger than $-\delta 3$ to equal to $-\delta 2$ and from larger than $\delta 2$ to equal to $\delta 3$. Each range is divided into different small portions correspond to the different radius $\Delta\rho$ of turning circle to be reduced during 0~1.0 m. Similarly, when the steering wheel angel is from equal to or larger than $-\delta 1$ to equal to 0 and from larger than 0 to equal to $\delta 1$, the intensity level of the radius of turning circle to be reduced is the first intensity level and the corresponding radius $\Delta\rho$ of turning circle to be reduced is from equal to or larger than 0 to equal to or less than 0.3 m; when the steering wheel angel is from larger than $-\delta 2$ to equal to $-\delta 1$ and from equal to or larger than $\delta 1$ to equal to $\delta 2$, the intensity level of the radius of turning circle to be reduced is the second intensity level and the corresponding radius $\Delta\rho$ of turning circle to be reduced is from equal to or larger than 0.3 m to equal to or less than 0.6 m; when the steering wheel angel is from equal to or larger than $-\delta 3$ to equal to $-\delta 2$ and from larger than $\delta 2$ to equal to $\delta 3$, the intensity level of the radius of turning circle to be reduced is the second intensity level and the corresponding radius $\Delta\rho$ of turning circle to be reduced is from equal to or larger than 0.6 m to equal to or less than 1.0 m.

The turning circle receiver 40 is not limited in the above two embodiments, in another embodiment, the turning circle receiver 40 can be used in accordance with the requirements of the appropriate form.

Thus, the demanded controlling yaw moment $\Delta M$ can be calculated according to the radius $\Delta\rho$ of turning circle to be reduced. The calculation process is as following:

$$\Delta\rho = v/\dot\psi des - v/\dot\psi 0$$

where, V is the current vehicle speed, $\dot\psi 0$ is the current yaw angle speed of the vehicle 100, $\dot\psi des$ is the target yaw angle speed of the vehicle 100;

thus a yaw angle speed increment $\Delta\dot\psi$ can be obtained by a formula of $\Delta\dot\psi = \dot\psi des - \dot\psi 0 = \Delta\rho \times \dot\psi 0^2/(v - \Delta\rho \times \dot\psi 0)$.

Known the yaw angle speed increment $\Delta\dot\psi$, the relationship formula between the demanded controlling yaw moment $\Delta M$ and the yaw angle speed increment $\Delta\dot\psi$ is $\Delta M = F(\Delta\dot\psi)$, and the demanded controlling yaw moment $\Delta M$ can be obtained according to theoretical formulas and the experimental data in different vehicles.

In an embodiment, the controlling yaw moment is distributed to four wheels 90 of the vehicle according to the radius of turning circle to be reduced and the vehicle condition information parameter of the vehicle. When the intensity level of the radius of turning circle to be reduced is the first intensity level, the controlling yaw moment is distributed to the rear inner wheel and the rear outer wheel respectively. In this condition, the target motor torque of the front inner wheel, the front outer wheel, the rear inner wheel and the rear outer wheel is as following:

$$Tm1 = Tm10;$$

$$Tm2 = Tm20;$$

$$Tm3 = Tm30 - \Delta M * R/lw/i3/\eta 3;$$

$$Tm4 = Tm40 + \Delta M * R/lw/i4/\eta 4;$$

where, Tm10, Tm20, Tm30 and Tm40 are the current motor torque of the front inner wheel, the front outer wheel, the rear inner wheel and the rear outer wheel respectively, Tm1, Tm2, Tm3 and Tm4 are the target motor torque of the front inner wheel, the front outer wheel, the rear inner wheel and the rear outer wheel respectively, R is a rolling radius of the wheel 90, and lw is a distance between two wheels 90 on the front shaft or the rear shaft.

It can be understood that, for the rear inner wheel, the torque $-\Delta M * R/lw/i3/\eta 3$ is applied, the obtained torque of the wheel terminal of the rear outer wheel is $-\Delta M * R/lw/i3/\eta 3 * \eta 3 * i3 = -\Delta M * R/lw$, the obtained force of the rear outer wheel is $(-\Delta M * R/lw)/R = -\Delta M/lw$, the obtained control torque is $(-\Delta M/lw) * (lw/2) = -\Delta M/2$, where, lw/2 is the distance vector from the rotating shaft to the focal point, "−" is a reverse direction i.e. is the wheel rolling in the opposite direction. Thus, the rear inner wheel can obtain half of the controlling yaw moment in the reverse direction. For the same condition, the rear outer wheel can obtain half of the controlling yaw moment in the positive direction.

When the intensity level of the radius of turning circle to be reduced is the second intensity level, the controlling yaw moment is distributed to the four wheels according to a first predetermined strategy, and the first predetermined strategy is mainly controlling the rear wheels and auxiliarily controlling the front wheels.

In an embodiment, the turning circle controller 11 calculates a first motor torque corresponding to the rear inner wheel when distributing half of the controlling yaw moment to the rear inner wheel in the reverse direction and a second motor torque corresponding to the rear outer wheel when distributing half of the controlling yaw moment to the rear inner wheel in the positive direction, the formulas are as following:

$Tm3p = Tm30 - \Delta M*R/lw/i3/\eta 3;$ $Tm4p = Tm40 - \Delta M*R/lw/i4/\eta 4;$ where, $Tm3p$ is the first motor torque corresponding to the rear inner wheel, $Tm4p$ is the second motor torque corresponding to the rear outer wheel, $Tm30$ is the current motor torque corresponding to the rear inner wheel, $Tm40$ is the current motor torque corresponding to the rear outer wheel.

And then, the turning circle controller 11 determines the first relationship between $|Tm3p|$ and $Tm3max$ and the second relationship between $|Tm4p|$ and $Tm4max$, where, $Tm3max$ is a first maximum peak motor torque corresponding to the rear inner wheel, $Tm4max$ is a second maximum peak motor torque corresponding to the rear outer wheel.

The determined result has four situations as follows.

(1) When $|Tm3p|<=Tm3max$ and $|Tm4p|<=Tm4max$, the target torque of the front inner wheel, the front outer wheel, the rear inner wheel and the rear outer wheel are as following:

$Tm1 = Tm10;$ $Tm2 = Tm20;$ $Tm3 = Tm30 - \Delta M*R/lw/i3/\eta 3;$ $Tm4 = Tm40 + \Delta M*R/lw/i4/\eta 4;$ in other words, when the absolute value of the first motor torque is less than or equal to the first maximum peak motor torque and the absolute value of the second motor torque is less than or equal to the second maximum peak motor torque, the turning circle controller 11 distributes half of the controlling yaw moment to the rear inner wheel in the reverse direction and distributes half of the controlling yaw moment to the rear outer wheel in the positive direction.

(2) When $|Tm3p|>Tm3max$ and $|Tm4p|<=Tm4max$, the target torque of the front inner wheel, the front outer wheel, the rear inner wheel and the rear outer wheel are as following:

$Tm1 = Tm10 - (1-k3)*\Delta M*R/lw/i1/\eta 1;$ $Tm2 = Tm20 + (1-k3)*\Delta M*R/lw/i2/\eta 2;$ $Tm3 = Tm30 - k3*\Delta M*R/lw/i3/\eta 3;$ $Tm4 = Tm40 + k3*\Delta M*R/lw/i4/\eta 4;$ where, $k3 = Tm3max*i3*\eta 3/R*lw/2/\Delta M.$ In other words, the turning circle controller 11 distributes a first predetermined value of the controlling yaw moment to the front inner wheel in the reverse direction, distributes a second predetermined value of the controlling yaw moment to the rear inner wheel in the reverse direction, distributes the first predetermined value of the controlling yaw moment to the front outer wheel in the positive direction and distributes the second predetermined value of the controlling yaw moment to the rear outer wheel in the positive direction, where the first predetermined value is $(1-k3)/2$, the second predetermined value is $k3/2$, in which, k3 is less than 1 and is obtained according to the first maximum peak motor torque, a transmission ration and a transmission efficiency.

(3) When $|Tm3p|<=Tm3max$ and $|Tm4p|>Tm4max$, the target torque of the front inner wheel, the front outer wheel, the rear inner wheel and the rear outer wheel are as following:

$Tm1 = Tm10 - (1-k4)*\Delta M*R/lw/i1/\eta 1;$ $Tm2 = Tm20 + (1-k4)*\Delta M*R/lw/i2/\eta 2;$ $Tm3 = Tm30 - k4*\Delta M*R/lw/i3/\eta 3;$ $Tm4 = Tm40 + k4*\Delta M*R/lw/i4/\eta 4;$ where, $k4 = Tm4max*i4*(\eta 4/R*lw/2/\Delta M.$ In other words, the turning circle controller 11 distributes a third predetermined value of the controlling yaw moment to the front inner wheel in the reverse direction, distributes a fourth predetermined value of the controlling yaw moment to the rear inner wheel in the reverse direction; distributes the third predetermined of the controlling yaw moment to the front outer wheel in the positive direction and distributes the fourth predetermined value of the controlling yaw moment to the rear outer wheel in the positive direction, where the third predetermined value is $(1-k4)/2$, the fourth predetermined value is $k4/2$, in which, k4 is less than 1 and is obtained according to the second maximum peak motor torque, the transmission rate and the transmission efficiency.

(4) When $|Tm3p|>Tm3max$ and $|Tm4p|>Tm4max$, the target torque of the front inner wheel, the front outer wheel, the rear inner wheel and the rear outer wheel are as following:

$Tm1 = Tm10 - 0.5*\Delta M*R/lw/i1/\eta 1;$ $Tm2 = Tm20 + 0.5*\Delta M*R/lw/i2/\eta 2;$ $Tm3 = Tm30 - 0.5*\Delta M*R/lw/i3/\eta 3;$ $Tm4 = Tm40 + 0.5*\Delta M*R/lw/i4/\eta 4;$ in other words, the turning circle controller 11 distribute a quarter of the controlling yaw moment to the front inner wheel in the reverse direction, distribute a quarter of the controlling yaw moment to the rear inner wheel in the reverse direction, distribute a quarter of the controlling yaw moment to the front outer wheel in the positive direction, and distribute a quarter of the controlling yaw moment to the rear outer wheel in the positive direction.

When the intensity level of the radius of turning circle to be reduced is the third intensity level, the controlling yaw moment is distributed to the four wheels according to a second predetermined strategy.

In an embodiment, the target torque of the front inner wheel, the front outer wheel, the rear inner wheel and the rear outer wheel are as following:

$Tm1 = Tm10 - 0.5*\Delta M*R/lw/i1/\eta 1;$ $Tm2 = Tm20 + 0.5*\Delta M*R/lw/i2/\eta 2;$ $Tm3=Tm30-0.5*\Delta M*R/lw/i3/\eta3;$ $Tm4=Tm40+0.5*\Delta M*R/lw/i4/\eta4;$ in other words, the controller 11 distribute a quarter of the controlling yaw moment to the front inner wheel in the reverse direction, distribute a quarter of the controlling yaw moment to the rear inner wheel in the reverse direction, distribute a quarter of the controlling yaw moment to the front outer wheel in the positive direction, and distribute a quarter of the controlling yaw moment to the rear outer wheel in the positive direction.

In an embodiment, the electronic stability program (ESP) in the vehicle controller 10 can control the vehicle stably according to the wheel slip rate S, the current sideslip angle β, the current yaw angel speed φ and the lateral acceleration ay to ensure the safety of the vehicle. The turning circle controller 11 needs to receive the torque limiting signal and responses to ensure the operation safety of the vehicle, and the priority of the ESP signal is greater than that of the signals of the turning circle controller 11.

In another embodiment, it also can save ESP.

Figure 7:
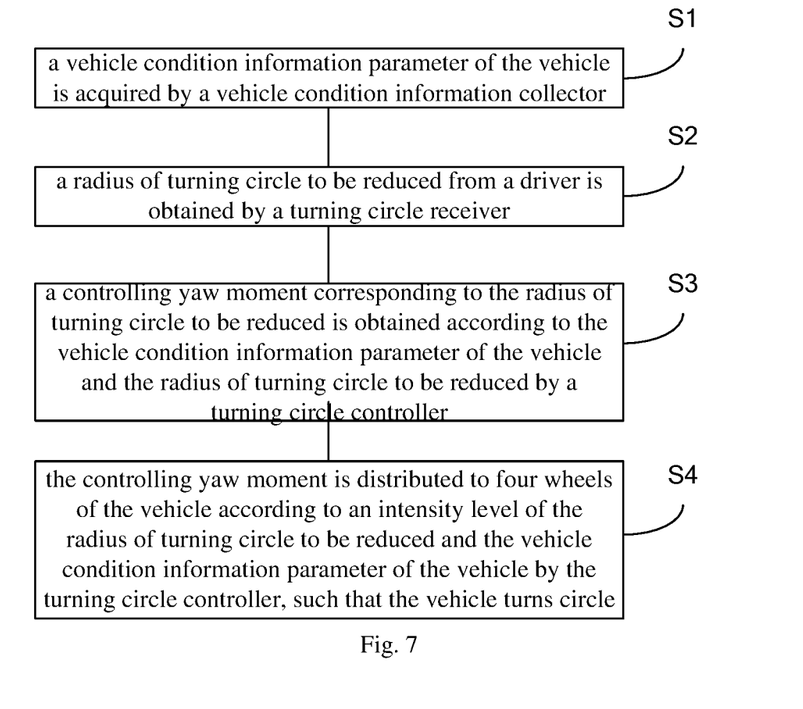
FIG. 7 is a flow chat of a method for controlling a vehicle with four-wheel drive according to an embodiment of the present disclosure.

FIG. 7 is a flow chat of a method for controlling a vehicle with four-wheel drive according to an embodiment of the present disclosure. As shown in FIG. 7, the control method includes followings.

At step S1, a vehicle condition information parameter of the vehicle is acquired by a vehicle condition information collector.

At step S2, a radius of turning circle to be reduced from a driver is obtained by a turning circle receiver.

At step S3, a controlling yaw moment corresponding to the radius of turning circle to be reduced is obtained according to the vehicle condition information parameter of the vehicle and the radius of turning circle to be reduced by a turning circle controller.

At step S4, the controlling yaw moment is distributed to four wheels of the vehicle according to an intensity level of the radius of turning circle to be reduced and the vehicle condition information parameter of the vehicle by the turning circle controller, such that the vehicle turns circle.

In an embodiment, the vehicle includes four electric motors, the four electric motors are corresponding to the four wheels respectively, each electric motor is configured to drive or brake back the corresponding wheel.

In an embodiment, the four wheels includes a front inner wheel, a front outer wheel, a rear inner wheel and a rear outer wheel, the intensity level of the radius of turning circle to be reduced includes a first intensity level, a second intensity level and a third intensity level, the radius of turning circle to be reduced in the first intensity level is less than the radius of turning circle to be reduced in the second intensity level, and the radius of turning circle to be reduced in the second intensity level is less than the radius of turning circle to be reduced in the third intensity level.

In an embodiment, the step S4 includes followings:

the controlling yaw moment is distributed to the rear inner wheel and the rear outer wheel when the intensity level of the radius of turning circle to be reduced is the first intensity level by the turning circle controller;

the controlling yaw moment is distributed to the four wheels according to a first predetermined strategy when the intensity level of the radius of turning circle to be reduced is the second intensity level, the first predetermined strategy is mainly controlling the rear wheels and auxiliarily controlling the front wheels by the turning circle controller; and the controlling yaw moment is distributed to the four wheels according to a second predetermined strategy when the intensity level of the radius of turning circle to be reduced is the third intensity level, the second predetermined strategy is that controlling a yaw moment distributed to the rear wheels is the same as that distributed to the front wheels by the turning circle controller.

The step of distributing the controlling yaw moment to the rear inner wheel and the rear outer wheel when the intensity level of the radius of turning circle to be reduced is the first intensity level by the turning circle controller includes following step of:

keeping motor torque of the electric motors corresponding to the front inner wheel and the front outer wheel to be constant;

distributing half of the controlling yaw moment to the rear inner wheel in a reverse direction; and distributing half of the controlling yaw moment to the rear outer wheel in a positive direction.

The step of distributing the controlling yaw moment to the four wheels according to a first predetermined strategy when the intensity level of the radius of turning circle to be reduced is the second intensity level by the turning circle controller includes following step of:

determining a first motor torque corresponding to the rear inner wheel when distributing half of the controlling yaw moment to the rear inner wheel in the reverse direction;

determining a second motor torque corresponding to the rear outer wheel when distributing half of the controlling yaw moment to the outer inner wheel in the positive direction; and distributing the controlling yaw moment to the four wheels according to the first motor torque, the second motor torque, a first maximum peak motor torque corresponding to the rear inner wheel, and a second maximum peak motor torque corresponding to the rear outer wheel.

Figure 8:
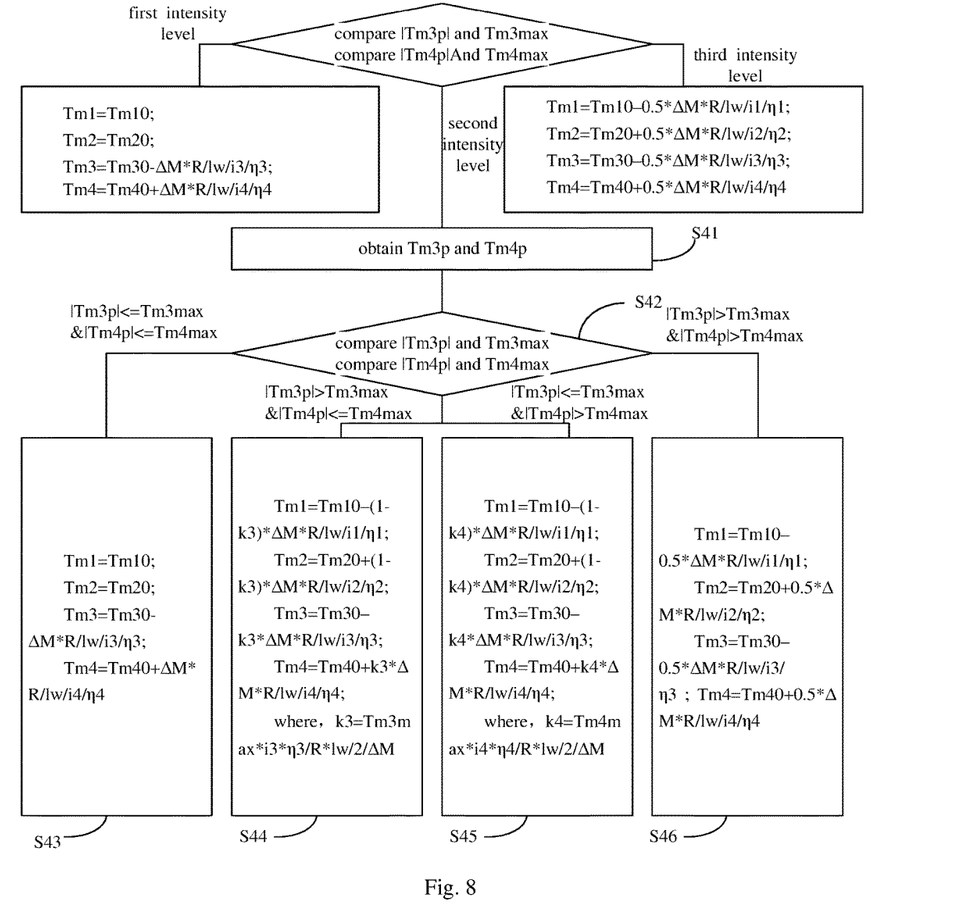
FIG. 8 is a flow chat of a method for controlling a vehicle with four-wheel drive according to another embodiment of the present disclosure.

FIG. 8 is a flow chat of a method for controlling a vehicle with four-wheel drive according to another embodiment of the present disclosure. As shown in FIG. 8, the step S4 includes followings.

At step S41, a first motor torque corresponding to the rear inner wheel when distributing half of the controlling yaw moment to the rear inner wheel in the reverse direction, and a second motor torque corresponding to the rear outer wheel is determined when distributing half of the controlling yaw moment to the rear inner wheel in the positive direction.

At step S42, the controlling yaw moment is distributed to the four wheels according to the first motor torque, the second motor torque, a first maximum peak motor torque corresponding to the rear inner wheel, and a second maximum peak motor torque corresponding to the rear outer wheel.

At step S43, if an absolute value of the first motor torque is less than or equal to the first maximum peak motor torque and an absolute value of the second motor torque is less than or equal to the second maximum peak motor torque, half of the controlling yaw moment is distributed to the rear inner wheel in the reverse direction, and half of the controlling yaw moment is distributed to the rear outer wheel in the positive direction.

At step S44, if the absolute value of the first motor torque is larger than the first maximum peak motor torque and the absolute value of the second motor torque is less than or equal to the second maximum peak motor torque, a first predetermined value of the controlling yaw moment is distributed to the front inner wheel in the reverse direction; a second predetermined value of the controlling yaw moment is distributed to the rear inner wheel in the reverse direction; the first predetermined value of the controlling yaw moment is distributed to the front outer wheel in the positive direction; and the second predetermined value of the controlling yaw moment is distributed to the rear outer wheel in the positive direction; wherein the first predetermined value is $(1-k3)/2$, the second predetermined value is $k3/2$, in which, $k3$ is less than 1 and is obtained according to the first maximum peak motor torque, a transmission ration and a transmission efficiency.

At step S45, if the absolute value of the first motor torque is less than or equal to the first maximum peak motor torque and the absolute value of the second motor torque is larger than the second maximum peak motor torque; a third predetermined value of the controlling yaw moment is distributed to the front inner wheel in the reverse direction; a fourth predetermined value of the controlling yaw moment is distributed to the rear inner wheel in the reverse direction; the third predetermined of the controlling yaw moment is distributed to the front outer wheel in the positive direction; and the fourth predetermined value of the controlling yaw moment is distributed to the rear outer wheel in the positive direction; wherein the third predetermined value is $(1-k4)/2$, the fourth predetermined value is $k4/2$, in which, $k4$ is less than 1 and is obtained according to the second maximum peak motor torque, the transmission rate and the transmission efficiency.

At step S46, if the absolute value of the first motor torque is larger than the first maximum peak motor torque and the absolute value of the second motor torque is larger than the second maximum peak motor torque; a quarter of the controlling yaw moment is to the front inner wheel in the reverse direction; a quarter of the controlling yaw moment is distributed to the rear inner wheel in the reverse direction; a quarter of the controlling yaw moment is distributed to the front outer wheel in the positive direction; and a quarter of the controlling yaw moment is distributed to the rear outer wheel in the positive direction.

In an embodiment, the vehicle includes the system for controlling a vehicle with four-wheel drive according to the above embodiments.

Any procedure or method described in the flow charts or described in any other way herein may be understood to comprise one or more modules, portions or parts for storing executable codes that realize particular logic functions or procedures. Moreover, advantageous embodiments of the present disclosure comprise other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a vehicle with four-wheel drive, comprising:
   acquiring a vehicle condition information parameter by a vehicle condition information collector;
   obtaining a radius of turning circle to be reduced from a driver by a turning circle receiver;
   obtaining a controlling yaw moment corresponding to the radius of turning circle to be reduced according to the vehicle condition information parameter and the radius of turning circle to be reduced by a turning circle controller; and
   distributing the controlling yaw moment to four wheels of the vehicle according to an intensity level of the radius of turning circle to be reduced and the vehicle condition information parameter by the turning circle controller, such that the vehicle turns circle.

2. The method of claim 1, wherein the vehicle comprises four electric motors, the four electric motors correspond to the four wheels respectively, and each electric motor is configured to drive or brake back the corresponding wheel.

3. The method of claim 1, wherein
the four wheels comprises a front inner wheel, a front outer wheel, a rear inner wheel and a rear outer wheel,
the intensity level of the radius of turning circle to be reduced comprises a first intensity level, a second intensity level and a third intensity level, the radius of turning circle to be reduced in the first intensity level is less than the radius of turning circle to be reduced in the second intensity level, and the radius of turning circle to be reduced in the second intensity level is less than the radius of turning circle to be reduced in the third intensity level;
the step of distributing the controlling yaw moment to four wheels of the vehicle according to an intensity level of the radius of turning circle to be reduced and the vehicle condition information parameter by the turning circle controller comprises:
distributing the controlling yaw moment to the rear inner wheel and the rear outer wheel when the intensity level of the radius of turning circle to be reduced is the first intensity level;
distributing the controlling yaw moment to the four wheels according to a first predetermined strategy when the intensity level of the radius of turning circle to be reduced is the second intensity level, the first predetermined strategy is mainly controlling the rear wheels and auxiliarily controlling the front wheels; and
distributing the controlling yaw moment to the four wheels according to a second predetermined strategy when the intensity level of the radius of turning circle to be reduced is the third intensity level, the second predetermined strategy is that a controlling yaw moment distributed to the rear wheels is the same as that distributed to the front wheels.

4. The method of claim 3, wherein the step of distributing the controlling yaw moment to the rear inner wheel and the rear outer wheel when the intensity level of the radius of turning circle to be reduced is the first intensity level comprises:
keeping motor torque of the electric motors corresponding to the front inner wheel and the front outer wheel to be constant;
distributing half of the controlling yaw moment to the rear inner wheel in a reverse direction; and
distributing half of the controlling yaw moment to the rear outer wheel in a positive direction.

5. The method of claim 3, wherein the step of distributing the controlling yaw moment to the four wheels according to a first predetermined strategy when the intensity level of the radius of turning circle to be reduced is the second intensity level, comprises:
determining a first motor torque corresponding to the rear inner wheel when distributing half of the controlling yaw moment to the rear inner wheel in the reverse direction;
determining a second motor torque corresponding to the rear outer wheel when distributing half of the controlling yaw moment to the rear outer wheel in the positive direction; and distributing the controlling yaw moment to the four wheels according to the first motor torque, the second motor torque, a first maximum peak motor torque corresponding to the rear inner wheel, and a second maximum peak motor torque corresponding to the rear outer wheel.

6. The method of claim 5, wherein the step of distributing the controlling yaw moment to the four wheels according to the first motor torque, the second motor torque, a first maximum peak motor torque corresponding to the rear inner wheel, and a second maximum peak motor torque corresponding to the rear outer wheel comprises:
when an absolute value of the first motor torque is less than or equal to the first maximum peak motor torque and an absolute value of the second motor torque is less than or equal to the second maximum peak motor torque,
keeping motor torque of the electric motors corresponding to the front inner wheel and the front outer wheel to be constant;
distributing half of the controlling yaw moment to the rear inner wheel in the reverse direction; and
distributing half of the controlling yaw moment to the rear outer wheel in the positive direction.

7. The method of claim 5, wherein the step of distributing the controlling yaw moment to the four wheels according to the first motor torque, the second motor torque, a first maximum peak motor torque corresponding to the rear inner wheel, and a second maximum peak motor torque corresponding to the rear outer wheel comprises:
when an absolute value of the first motor torque is larger than the first maximum peak motor torque and an absolute value of the second motor torque is less than or equal to the second maximum peak motor torque,
distributing a first predetermined value of the controlling yaw moment to the front inner wheel in the reverse direction;
distributing a second predetermined value of the controlling yaw moment to the rear inner wheel in the reverse direction;
distributing the first predetermined value of the controlling yaw moment to the front outer wheel in the positive direction; and
distributing the second predetermined value of the controlling yaw moment to the rear outer wheel in the positive direction;
wherein the first predetermined value is $(1-k3)/2$, and the second predetermined value is $k3/2$, in which, $k3$ is less than 1 and is obtained according to the first maximum peak motor torque, a transmission ration and a transmission efficiency.

8. The method of claim 5, wherein the step of distributing the controlling yaw moment to the four wheels according to the first motor torque, the second motor torque, a first maximum peak motor torque corresponding to the rear inner wheel, and a second maximum peak motor torque corresponding to the rear outer wheel comprises:
when an absolute value of the first motor torque is less than or equal to the first maximum peak motor torque and an absolute value of the second motor torque is larger than the second maximum peak motor torque,
distributing a third predetermined value of the controlling yaw moment to the front inner wheel in the reverse direction;
distributing a fourth predetermined value of the controlling yaw moment to the rear inner wheel in the reverse direction;

distributing the third predetermined of the controlling yaw moment to the front outer wheel in the positive direction; and distributing the fourth predetermined value of the controlling yaw moment to the rear outer wheel in the positive direction;

wherein the third predetermined value is $(1-k4)/2$, the fourth predetermined value is $k4/2$, in which, $k4$ is less than 1 and is obtained according to the second maximum peak motor torque, the transmission rate and the transmission efficiency.

9. The method of claim 5, wherein the step of distributing the controlling yaw moment to the four wheels according to the first motor torque, the second motor torque, a first maximum peak motor torque corresponding to the rear inner wheel, and a second maximum peak motor torque corresponding to the rear outer wheel comprises:

when an absolute value of the first motor torque is larger than the first maximum peak motor torque and an absolute value of the second motor torque is larger than the second maximum peak motor torque;

distributing a quarter of the controlling yaw moment to the front inner wheel in the reverse direction;

distributing a quarter of the controlling yaw moment to the rear inner wheel in the reverse direction;

distributing a quarter of the controlling yaw moment to the front outer wheel in the positive direction; and distributing a quarter of the controlling yaw moment to the rear outer wheel in the positive direction.

10. The method of claim 3, wherein the step of distributing the controlling yaw moment to the four wheels according to a second predetermined strategy when the intensity level of the radius of turning circle to be reduced is the third intensity level comprises:

distributing a quarter of the controlling yaw moment to the front inner wheel in the reverse direction;

distributing a quarter of the controlling yaw moment to the rear inner wheel in the reverse direction;

distributing a quarter of the controlling yaw moment to the front outer wheel in the positive direction; and distributing a quarter of the controlling yaw moment to the rear outer wheel in the positive direction.

11. A system for controlling a vehicle with four-wheel drive, comprising:

a turning circle receiving dashboard configured to obtain a radius of turning circle to be reduced from a driver; and a turning circle controller, communicating with the turning circle receiving dashboard, and configured to obtain a controlling yaw moment corresponding to the radius of turning circle to be reduced according to a vehicle condition information parameter and the radius of turning circle to be reduced, and to distribute the controlling yaw moment to four wheels of the vehicle according to an intensity level of the radius of turning circle to be reduced and the vehicle condition information parameter, such that the vehicle turns circle.

12. The system of claim 11, wherein the vehicle comprises four electric motors, the four electric motors correspond to the four wheels respectively, and each electric motor is configured to drive or brake back the corresponding wheel.

13. The system of claim 11, wherein the four wheels comprises a front inner wheel, a front outer wheel, a rear inner wheel and a rear outer wheel, the intensity level of the radius of turning circle to be reduced comprises a first intensity level, a second intensity level and a third intensity level, the radius of turning circle to be reduced in the first intensity level is less than the radius of turning circle to be reduced in the second intensity level, and the radius of turning circle to be reduced in the second intensity level is less than the radius of turning circle to be reduced in the third intensity level;

the controller is further configured to:

distribute the controlling yaw moment to the rear inner wheel and the rear outer wheel when the intensity level of the radius of turning circle to be reduced is the first intensity level;

distribute the controlling yaw moment to the four wheels according to a first predetermined strategy when the intensity level of the radius of turning circle to be reduced is the second intensity level, the first predetermined strategy is mainly controlling the rear wheels and auxiliarily controlling the front wheels; and distribute the controlling yaw moment to the four wheels according to a second predetermined strategy when the intensity level of the radius of turning circle to be reduced is the third intensity level, the second predetermined strategy is that a controlling yaw moment distributed to the rear wheels is the same as that distributed to the front wheels.

14. The system of claim 13, wherein when the intensity level of the radius of turning circle to be reduced is the first intensity level, the controller is further configured to:

keep motor torque of the electric motors corresponding to the front inner wheel and the front outer wheel to be constant;

distribute half of the controlling yaw moment to the rear inner wheel in a reverse direction; and distribute half of the controlling yaw moment to the rear outer wheel in a positive direction.

15. The system of claim 14, wherein when the intensity level of the radius of turning circle to be reduced is the second intensity level, the controller is further configured to:

determine a first motor torque corresponding to the rear inner wheel when distributing half of the controlling yaw moment to the rear inner wheel in the reverse direction;

determine a second motor torque corresponding to the rear outer wheel when distributing half of the controlling yaw moment to the rear outer wheel in the positive direction; and distribute the controlling yaw moment to the four wheels according to the first motor torque, the second motor torque, a first maximum peak motor torque corresponding to the rear inner wheel, and a second maximum peak motor torque corresponding to the rear outer wheel.

16. The system of claim 15, wherein when an absolute value of the first motor torque is less than or equal to the first maximum peak motor torque and an absolute value of the second motor torque is less than or equal to the second maximum peak motor torque, the controller is further configured to:

keep motor torque of the electric motors corresponding to the front inner wheel and the front outer wheel to be constant;

distribute half of the controlling yaw moment to the rear inner wheel in the reverse direction; and distribute half of the controlling yaw moment to the rear outer wheel in the positive direction.

17. The system of claim 15, wherein when an absolute value of the first motor torque is larger than the first maximum peak motor torque and an absolute value of the second motor torque is less than or equal to the second maximum peak motor torque, the controller is further configured to:
- distribute a first predetermined value of the controlling yaw moment to the front inner wheel in the reverse direction;
- distribute a second predetermined value of the controlling yaw moment to the rear inner wheel in the reverse direction;
- distribute the first predetermined value of the controlling yaw moment to the front outer wheel in the positive direction; and
- distribute the second predetermined value of the controlling yaw moment to the rear outer wheel in the positive direction;
- wherein the first predetermined value is $(1-k3)/2$, and the second predetermined value is $k3/2$, in which, k3 is less than 1 and is obtained according to the first maximum peak motor torque, a transmission ration and a transmission efficiency.

18. The system of claim 15, wherein when an absolute value of the first motor torque is less than or equal to the first maximum peak motor torque and an absolute value of the second motor torque is larger than the second maximum peak motor torque, the controller is further configured to:
- distribute a third predetermined value of the controlling yaw moment to the front inner wheel in the reverse direction;
- distribute a fourth predetermined value of the controlling yaw moment to the rear inner wheel in the reverse direction;
- distribute the third predetermined of the controlling yaw moment to the front outer wheel in the positive direction; and
- distribute the fourth predetermined value of the controlling yaw moment to the rear outer wheel in the positive direction;
- wherein the third predetermined value is $(1-k4)/2$, the fourth predetermined value is $k4/2$, in which, k4 is less than 1 and is obtained according to the second maximum peak motor torque, the transmission ration and the transmission efficiency.

19. The system of claim 15, wherein when an absolute value of the first motor torque is larger than the first maximum peak motor torque and an absolute value of the second motor torque is larger than the second maximum peak motor torque, the controller is further configured to:
- distribute a quarter of the controlling yaw moment to the front inner wheel in the reverse direction; and
- distribute a quarter of the controlling yaw moment to the rear inner wheel in the reverse direction;
- distribute a quarter of the controlling yaw moment to the front outer wheel in the positive direction; and
- distribute a quarter of the controlling yaw moment to the rear outer wheel in the positive direction.

20. A vehicle, comprising the system for controlling a vehicle with four-wheel drive of claim 11.

* * * * *